United States Patent [19]  
Kusayama et al.

[11] 3,870,675  
[45] Mar. 11, 1975

[54] TWO-COMPONENT ADHESIVE

[75] Inventors: Seiji Kusayama; Koichi Ohashi; Shinzo Takada, all of Osaka, Japan

[73] Assignee: Sumitomo Chemical Company, Limited, Osaka-shi, Osaka-fu, Japan

[22] Filed: July 24, 1972

[21] Appl. No.: 274,424

[30] Foreign Application Priority Data
July 22, 1971    Japan.................................. 46-55028

[52] U.S. Cl..... 260/32.8 A, 260/32.8 EP, 260/33.4, 260/879, 260/885, 260/886, 252/426, 252/431, 252/438
[51] Int. Cl. ........................ C08g 51/34, C08f 19/20
[58] Field of Search....... 260/32.8 A, 32.8 EP, 33.4, 260/879, 885, 886; 252/438, 426, 431

[56] References Cited
UNITED STATES PATENTS
2,879,252   3/1959   Been et al..................... 260/32.8 A
3,310,603   3/1967   Kelly............................. 260/32.8 a OTHER PUBLICATIONS
Lee-Neville, Handbook of Epoxy Resins, (McGraw-Hill, 1967), pp. 8-15, 11-12, 10-19, 12-3, 12-13, 16-16 to 16-20.

Primary Examiner—Morris Liebman  
Assistant Examiner—T. De Benedictis, Sr.  
Attorney, Agent, or Firm—Craig & Antonelli

[57] ABSTRACT

A two-component adhesive consisting of (1) a main composition comprising about 40 to about 80 parts by weight of at least one of divinyl compounds of the formula:

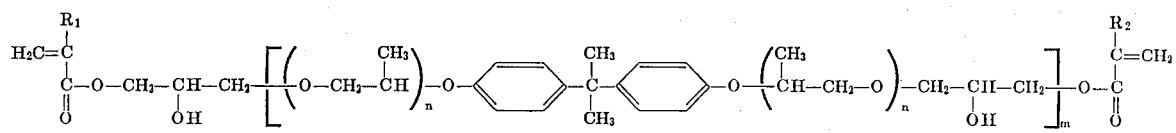

wherein $R_1$ and $R_2$ are each hydrogen, methyl or ethyl, $n$ is an integer of 1 to 5 and $m$ is an integer of 1 to about 10, 0.05 to about 10 parts by weight of an organic peroxide, about 2 to about 120 parts by weight of at least one mono-vinylic monomer selected from the group consisting of vinyl acetate, methacrylic acid, acrylic acid, glycidyl methacrylate and $\beta$-hydroxyethyl methacrylate (the amount of each vinylic monomer not exceeding 40 parts by weight); and about 0.5 to about 15 parts by weight of at least one rubber material selected from the group consisting of acrylonitrile-butadiene-styrene polymer (ABS), acrylonitrile-butadiene rubber (NBR) and carboxylated NBR; and (2) an accelerator composition comprising about 0.01 to about 10 parts by weight of a thiourea compound; about 0.01 to about 10 parts by weight of $\alpha, \alpha'$-dipyridyl; 0.001 to 5 parts by weight of at least one of copper salts, cobalt salts, manganese salts, chromium salts and vanadium salts of organic and inorganic acids; and 75 to 100 parts by weight of an organic volatile solvent. The two components of the adhesive are each applied to separate articles and then the articles are combined together.

26 Claims, No Drawings

TWO-COMPONENT ADHESIVE

The present invention relates to a two-component adhesive capable of providing excellent adhesion in a short time, and its preparation and use. It also relates to a novel divinyl compound used in the adhesive.

Hitherto, there have been known various two-component adhesives containing, as the active component, polyester acrylate, resorcinol, phenol, epoxy compound, isocyanate, acrylic compound or the like. On their use, the components are required to be weighed precisely and mixed well together prior to the binding operation. If the weighing is made unprecisely or the mixing is effected insufficiently, the adhesion strength may become inferior. Further, the components, when once mixed, immediately begin to react to each other and, in a certain time, the viscosity of the adhesive composition will increase resulting in solidifying lastly to make the adhesive composition unusable. Therefore, the adhesive composition after mixing must be used up within a certain time, and besides, the effective time is greatly influenced by the temperature. Moreover, these conventional adhesive compositions take a considerable time for curing when used at room temperature, and there are required usually at least 24 hours for obtaining a sufficient adhesion strength. At a low temperature as in the winter season, the adhesion is not executed, or even if executed, a long time is necessitated for attaining a satisfactory strength. In order to increase the curing rate, heating or warming is occasionally effected. In such case, however, a special equipment is needed to make the adhesion operation complicated and uneconomical.

As the results of the extensive study, there has now been provided a novel two-component adhesive overcoming the above-noted drawbacks seen in the known adhesives.

The basic object of the present invention is to provide a two-component adhesive consisting of a specific main composition and a specific accelerator composition which can produce an excellent adhesion strength in an extremely short time. Another object of this invention is to provide a two-component adhesive which can be employed without any complicated operation such as weighing or mixing, may be cured in an extremely short time at room temperature or a lower temperature as in the winter season assuring the satisfactory adhesion strength and is excellent in the stability on storage. A further object of the invention is to provide a two-component adhesive which can be handled just like a one-component adhesive by applying the main composition to one of the materials to be bound and contacting it with the other which has been precisely applied the accelerator composition. These and other objects will be apparent to those skilled in the subsequent descriptions.

The two-component adhesive of the present invention consists of two component compositions, i.e., (1) a main composition comprising a divinyl compound of the formula:

wherein $R_1$ and $R_2$ are each hydrogen, methyl or ethyl, $n$ is an integer of 1 to 5 and $m$ is an integer of 1 to 10 with a small amount of an organic peroxide and (2) an accelerator composition comprising a catalyst in an organic volatile solvent.

More particularly, it consists of (1) a main composition comprising about 40 to about 80 parts by weight of at least one of the divinyl compounds [I]; about 0.05 to about 10 parts by weight of an organic peroxide; about 2 to about 120 parts by weight of at least one mono-vinylic monomer selected from the group consisting of vinyl acetate, methacrylic acid, acrylic acid, glycidyl methacrylate and β-hydroxyethyl methacrylate (the amount of each mono-vinylic monomer not exceeding 40 parts by weight) and about 0.5 to about 15 parts by weight of at least one rubber material selected from the group consisting of acrylonitrile-butadiene-styrene polymer (ABS), acrylonitrile-butadiene rubber (NBR) and carboxylated NBR; and (2) an accelerator composition comprising about 0.01 to about 10 parts by weight of a thiourea compound; about 0.01 to about 10 parts by weight of α, α'-dipyridyl; about 0.001 to about 5 parts by weight of at least one of copper salts, cobalt salts, manganese salts, chromium salts and vanadium salts of organic and inorganic acids; and about 75 to about 100 parts by weight of an organic volatile solvent.

In the adhesive composition of the invention, the combined use of the main composition and the accelerator composition contributes to the assurance of the instantaneous curing property of the adhesive composition and to the attainment of satisfactory results in the primary adhesion strength, the impact strength, the peel strength, the heat-resistance and the like. Thus the main composition and the accelerator composition are usually applied separately. In use, these components are each applied on separate articles and then the articles are combined together. About 0.5 to about 1.0 parts by weight or volume of accelerator composition is usually used to about 1.0 part by weight or volume of main composition. These represent workable ratios. Other ratios may also be utilized.

The "instantaneous curing property" hereinabove used means that a considerable adhesion strength (e.g. 10 kg/cm² or more in tensile strength in case of the adhesion of steel-made substances) can be produced within several 10 seconds after contacting the surfaces of the materials to be bound which have been applied an adhesive composition.

The main composition of the adhesive of the invention comprises about 40 to about 80 parts by weight (preferably about 45 to about 60 parts by weight) of at least one of the divinyl compounds [I], about 0.05 to about 10 parts by weight (preferably about 0.5 to about 5 parts by weight) of an organic peroxide, about 2 to about 120 parts by weight (preferably about 10 to about 120 parts by weight) of at least one mono-vinylic monomer selected from the group consisting of vinyl acetate, methacrylic acid, acrylic acid, glycidyl metha-

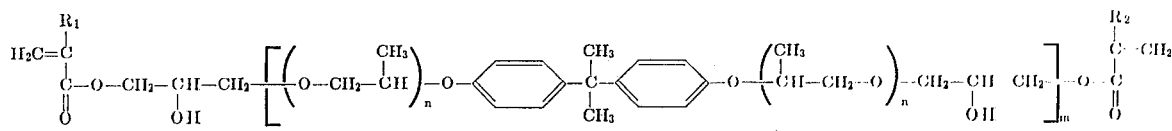

crylate and β-hydroxyethyl methacrylate (the amount of each mono-vinylic monomer not exceeding 40 parts by weight) and about 0.5 to about 15 parts by weight (preferably about 1.0 to about 10 parts by weight) of at least one rubber material selected from the group consisting of ABS, NBR and carboxylated NBR. (Acids used to form particularly suitable carboxylated NBR rubber include acrylic and methacrylic acid.)

When desired, the main composition may include about 1 to about 80 parts by weight (preferably about 15 to about 50 parts by weight) of a heat-resistant additive and/or about 1 to about 50 parts by weight (preferably about 10 to about 30 parts by weight) of a plasticizer in addition to the said essential components.

The divinyl compound [I] to be used as the main component in the main composition is a novel compound of a transparent, light yellow, viscous liquid and may be prepared, for instance, by reacting 1 mol of a glycol diglycidyl ether, for instance, having an epoxy equivalent of 330–360 and a viscosity of 30–40 cps at 25°C. (e.g., "Adeka Resin EP–4000" manufactured by Asahi Denka Kogyo Co., Ltd., having a structural formula corresponding to Formula I except that the end groups $R_1-C(=CH_2)$ $-C(=O)-O-CH_2-CH(OH)-CH_2$ and $R_2-C(=CH_2)-C(=O)-O-CH_2-CH(OH)-CH_2$) which is obtained by reacting 2,2-bis-(p-hydroxyphenyl)-propane and propylene oxide, with about 2 mols of acrylic compounds such as methacrylic acid, acrylic acid and α-ethylacrylic acid in the presence of a catalyst such as triethylamine at a temperature of 40° to 80°C. for 10 to 35 hours.

Examples of the organic peroxide as the catalyst for the initiation of the polymerization include cumene hydroperoxide, 2-methylbutene hydroperoxide, ethyl ether hydroperoxide, 2,5-dimethylhexane hydroperoxide, p-menthane hydroperoxide and t-butyl hydroperoxide. These peroxides may be used alone or in combination.

The mono-vinylic monomer contributes to the improvement of the curing rate and the primary adhesion strength.

The rubber material (which is unvulcanized) is available for improving the impact strength and the shear strength of the adhesion resulting from the application of the adhesive composition.

For further improvement of the impact strength and the shear strength, it is preferable to incorporate a plasticizer such as di-n-butyl phthalate, di-2-ethylhexyl phthalate, butyl benzyl phthalate, di-2-ethylhexyl adipate, dimethyl sebacate, diethyl sebacate, dibutyl sebacate, tri-2-ethylhexyl phosphate or tricresyl phosphate.

When the heat-resistance is required, a heat-resistant additive is added to the main composition. Examples of the heat-resistant additive are vinyl laurate, N-vinylurethane, divinylbenzene, N-vinylglycidylurethane, diallyl laurate, diallyl phthalate, diallylmelamine, triallyl cyanurate and triacrylformal.

Since the main composition can attain a satisfactory adhesion under heating, it may be used alone as a one-component adhesive composition. A marked adhesive effect is, however, obtained by the combined use of the main composition and the accelerator composition.

The accelerator composition of the invention comprises about 0.01 to about 10 parts by weight (preferably about 0.1 to about 7 parts by weight) of a thiourea derivative, about 0.01 to about 10 parts by weight (preferably about 0.05 to about 5 parts by weight) of α, α'-dipyridyl, about 0.001 to about 5 parts by weight (preferably about 0.001 to about 3 parts by weight) of at least one of copper salts, cobalt salts, manganese salts, chromium salts and vanadium salts of organic and inorganic acids and about 75 to about 100 parts by weight of an organic volatile solvent.

As the thiourea compound, there may be used, for instance, trimethylthiourea, dipropionylthiourea, diacetylthiourea, tetramethylthiourea or the like.

Examples of the metal salts of organic and inorganic acids include the hydrochlorides, sulfates, nitrate, phosphates, aliphatic carboxylates and aromatic carboxylates of the said metals. Among them, the aliphatic lower carboxylate tartrate and propionate and naphthenate are the most preferable.

As the organic volatile solvent, there may be favorably used the one which is less toxic and volatilizes at room temperature such as a lower alcohol, a ketone, an ester or a halogenated hydrocarbon. Specific examples of the solvent are methanol, acetone, methylethylketone, methylene chloride, ethylene trifluoride, ethylene chlorofluoride, etc.

In the accelerator composition of the present invention, the use of only one or two of the said essential components does not assure any sufficient instantaneous curing property and adhesion strength for the ultimate adhesive composition. Even if a high primary adhesion strength is obtained, the strength after several hours may be low. Only when all of the said components are present, satisfactory results can be realized.

For binding materials by the use of the adhesive composition of the invention, the main composition may be applied to one of the materials to be bound and the accelerator composition to the other and both materials are then contacted closely at the applied portions. Alternatively, both materials may be applied the accelerator composition and the main composition in this order and then contacted closely at the applied portions. In further alternative, one of the materials may be applied the main composition and contacted with the other which has been previously applied the accelerator composition.

Since the adhesive composition of the invention is extremely stable, it may be packed in a vessel together with a suitable propellant for spray application to simplify the operation.

The materials to be bound may be made of metals (e.g., iron, copper, nickel, aluminum, brass), plastics (e.g., polyvinyl chloride resin, polyacrylic resin, polyepoxy resin, nylon), woods, glass, ceramics or the like.

Practical and presently preferred embodiments of the present invention are illustratively shown in the following Examples wherein the main composition and the accelerator composition are applied separately in the manner and in workable proportions heretofore described, parts are by weight.

EXAMPLE 1

In a three-necked flask equipped with an agitator, there are charged "Adeka Resin EP–4000" (207 parts) and methacrylic acid (48 parts), and triethylamine (3.5 parts) is added thereto at 45°C. while stirring. After maintaining at 50°C. for 10 hours, acrylic acid (12 parts) is added to the resultant mixture, and the reaction is carried out at 55°C. for 9 hours to give a light yellow viscous liquid of 3,000 cps in viscosity (hereinafter referred to as "liquid A.").

The liquid A (100 parts) is admixed with a vinylic monomer as shown in Table 1, and NBR (6 parts) and cumene hydroperoxide (3 parts) are added thereto to make a main composition. Separately, tetramethylthiourea (0.8 part), cobalt acetate (0.01 part), cobalt naphthenate (0.05 part) and $\alpha, \alpha'$-dipyridyl (1.0 part) are dissolved in an acetoneethanol mixture (8 : 2) (100 parts) to make an accelerator composition.

On the top surface of a steel-made cylindrical piece of 1 cm$^2$ in section area, the accelerator composition is applied. After about 30 seconds, the applied surface is closely contacted with the bottom surface of another steel-made cylindrical piece of 1 cm$^2$ in section area, the said bottom surface having been applied the main composition prior to the contacting. The tensile strength is measured 5 minutes, 15 minutes and 24 hours after the contacting.

The results are shown in Table 1, from which it is seen that the incorporation of the mono-vinylic monomer into the main composition results in the increase of the tensile strength and the primary adhesion strength.

Table 1

| Mono-vinylic monomer | | Tensile strength after contact (kg/cm$^2$) | | |
|---|---|---|---|---|
| Kind | Amount added (part) | 5 min. | 15 min. | 24 hrs. |
| None | 0 | 20 | 85 | 96 |
| Vinyl acetate | 40 | 90 | 110 | 132 |
| Methacrylic acid | 35 | 78 | 96 | 115 |
| Acrylic acid | 35 | 84 | 105 | 120 |
| $\beta$-Hydroxyethyl methacrylate | 40 | 93 | 103 | 126 |

EXAMPLE 2

The liquid A obtained in Example 1 (100 parts) is admixed with vinyl acetate (35 parts), acrylic acid (35 parts) NBR (6 parts) and a peroxide as shown in Table 2 to make a main composition.

Using the main composition and the accelerator composition obtained in Example 1, two steel-made cylindrical pieces are adhered each other in the same manner as in Example 1. The tensile strength is measured 5 minutes, 15 minutes and 24 hours after the adhering.

The results are shown in Table 2, from which it is seen that a considerable adhesion strength is attained in an extremely short time.

Table 2

| Peroxide | | Tensile strength after contact (kg/cm$^2$) | | |
|---|---|---|---|---|
| Kind | Amount added (part) | 5 min. | 15 min. | 24 hrs. |
| Cumene hydroperoxide | 3 | 102 | 118 | 128 |
| p-Menthane hydroperoxide | 2 | 78 | 105 | 125 |
| t-Butyl hydroperoxide | 4 | 90 | 103 | 114 |

EXAMPLE 3

The liquid A obtained in Example 1 (100 parts) is admixed with cumene hydroperoxide (4 parts), acrylic acid (40 parts) and vinyl acetate (30 parts), and a rubber material as shown in Table 3 is added thereto to make a main composition. Separately, tetramethylthiourea (0.5 part), cobalt acetate (0.05 part), cobalt naphthenate (0.03 part) and $\alpha, \alpha'$-dipyridyl (0.2 part) are dissolved in acetone (100 parts) to make an accelerator composition.

Using the thus obtained main composition and the accelerator composition, two steel-made cylindrical pieces are contacted each other, and the tensile strength is measured as in Example 1.

Also, the accelerator composition is applied on the surface of a steel-made rectangular strip of 25 mm in width, 100 mm in length and 1.6 mm in thickness, the application being made 12.5 mm with from the one edge. The main composition is applied on the one surface of another steel-made rectangular strip as above in the similar manner. The strips are contacted each other at the applied portions. After 24 hours, the shear strength is measured by the aid of a tensile tester ("Omnipotent tester RS-2" manufactured by Shimadzu Seisakusho Ltd.) at a velocity of 45 mm/min.

The results are shown in Table 3, from which it is seen that the shear strength is markedly increased by Table 3

| Rubber material | | Tensile strength after contact (kg/cm$^2$) | | Shear strength (kg/cm$^2$) |
|---|---|---|---|---|
| Kind | Amount added (part) | 5 min. | 24 hrs. | 24 hrs. at room temperature |
| None | 0 | 104 | 133 | 85 |
| NBR | 8 | 95 | 127 | 273 |
| Carboxylated NBR | 8 | 111 | 141 | 256 |
| Carboxylated NBR | 15 | 100 | 121 | 232 |
| Carboxylated NBR | 30 | 77 | 108 | 196 |
| NBR + Carboxylated NBR | 4 / 4 | 98 | 122 | 269 |
| ABS | 8 | 108 | 146 | 260 | the incorporation of NBR, carboxylated NBR (Hycar 1072 manufactured by Nippon Zeon Co., Ltd.) or ABS into the main composition.

EXAMPLE 4

The liquid A obtained in Example 1 (100 parts) is admixed with cumene hydroperoxide (4 parts), vinyl acetate (40 parts) and carboxylated NBR (8 parts), and a heat1resistant additive as shown in Table 4 is added thereto to make a main composition.

Using the thus obtained main composition and the accelerator composition obtained in Example 3, the shear strength is measured as in Example 3.

The results are shown in Table 4, from which it is seen that the heat deterioration of the adhesive is markedly prevented by the incorporation of the heat-resistant additive into the main composition.

Table 4

| Heat-resistant additive | | Shear strength (kg/cm$^2$) | | |
|---|---|---|---|---|
| Kind | Amount added (part) | 24 hrs. at room temperature | after 24 hrs. at room temperature | |
| | | | 6 hrs. at 120°C. | 14 days at 120°C. |
| None | 0 | 256 | 234 | 140 |
| Diallyl phthalate | 50 | 190 | 242 | 226 |
| Triacryl formal | 30 | 175 | 222 | 217 |

EXAMPLE 5

The liquid A obtained in Example 1 (100 parts) is admixed with cumene hydroperoxide (2.5 parts) and vinyl acetate (40 parts), and NBR and a plasticizer as shown in Table 5 are added thereto to make a main composition.

using the thus obtained main composition and the accelerator composition obtained in Example 3, the impact strength is measured according to ASTM-D-950-54.

The results are shown in Table 5, from which it is seen that the impact strength is remarkably increased by the incorporation of a plasticizer and/or NBR.

Table 5

| NBR | Plasticizer | | Impact strength (kg-cm/cm$^2$) |
|---|---|---|---|
| Amount added (part) | Kind | Amount added (part) | 24 hrs. at room temperature |
| 0 | None | 0 | 1.7 |
| 8 | None | 0 | 11.8 |
| 8 | Dibutyl sebacate | 40 | 15.2 |
| 8 | Di-2-ethyl-hexyl phthalate | 30 | 14.5 |

EXAMPLE 6

The liquid A obtained in Example 1 (100 parts) is admixed with cumene hydroperoxide (4 parts), vinyl acetate (30 parts), acrylic acid (30 parts), NBR (5 parts), diallyl phthalate (25 parts) and dibutyl sebacate (20 parts) to make a main composition.

Using the thus obtained main composition and the accelerator composition as shown in Table 6, two steel- Table 6

| Accelerator composition | | Tensile strength after contact (kg/cm$^2$) | | | |
|---|---|---|---|---|---|
| Components | Content (part) | 30 sec. | 1 min. | 5 min. | 24 hrs. |
| None | 0 | 0 | 0 | 0 | 0 |
| α, α'-Dipyridyl | 1.2 | | | | |
| Tetramethyl-thiourea | 0.9 | 14 | 24 | 55 | 170 |
| Cobalt chloride | 0.01 | | | | |
| Manganese acetate | 0.02 | | | | |
| Acetone | 100.0 | | | | |
| α,α'-Dipyridyl | 0.06 | | | | |
| Diacetylthiourea | 2.9 | | | | |
| Copper acetate | 0.06 | 10 | 20 | 48 | 162 |
| Acetone | 90.0 | | | | |
| α,α'-Dipyridyl | 0.1 | | | | |
| Trimethylthiourea | 2.3 | | | | |
| Cobalt acetate | 0.002 | 17 | 28 | 64 | 195 |
| Cobalt naphthenate | 0.006 | | | | |
| Acetone | 85.0 | | | | |
| α,α'-Dipyridyl | 0.09 | | | | |
| Dipropionyl-thiourea | 2.8 | | | | |
| | | 11 | 29 | 65 | 178 |
| Chromiun naphthenate | 0.012 | | | | |
| Acetone | 100.0 | | | | |
| α,α'-Dipyridyl | 0.05 | | | | |
| Tetramethylthiourea | 0.5 | | | | |
| Copper naphthenate | 0.01 | 16 | 30 | 70 | 183 |
| Vanadium chloride | 0.01 | | | | |
| Acetone | 80.0 | | | | |
| Ethanol | 20.0 | | | | | made cylindrical pieces are adhered each other in the same manner as in Example 1. The tensile strength is measured 30 seconds, 1 minute, 5 minutes and 24 hours after the adhering.

The results are shown in Table 6, from which it is seen that a considerable adhesion strength is attained in an extremely short time.

EXAMPLE 7

In a three-necked flask equipped with an agitator, there are charged "Adeka Resin EP-4000" (207 parts) and acrylic acid (52 parts), and triethylamine (3.5 parts) is added thereto at 50°C. while stirring. The reaction is carried out at 50°C. for 20 hours under stirring to give a light yellow viscous liquid of 3,000 cps in viscosity (hereinafter referred to as "liquid B").

The liquid B (100parts) is admixed with a mono-vinylic monomer as shown in Table 7, and NBR (6 parts) and cumene hydroperoxide (3 parts) are added thereto to make a main composition.

Using the main composition and the accelerator composition obtained in Example 1, two steel-made cylindrical pieces are adhered each other in the same manner as in Example 1. The tensile strength is measured 5 minutes, 15 minutes and 24 hours after the adhering.

The results are shown in Table 7, from which it is seen that a considerable adhesion strength is attained in an extremely short time.

Table 7

| Mono-vinylic monomer | | Tensile strength after contact (kg/cm$^2$) | | |
|---|---|---|---|---|
| Kind | Amount added (part) | 5 min. | 15 min. | 24 hrs. |
| None | 0 | 35 | 108 | 120 |
| Vinyl acetate | 35 | 88 | 123 | 226 |
| Methacrylic acid | 35 | 117 | 135 | 214 |
| β-Hydroxyethyl methacrylate | 32 | 96 | 124 | 227 |
| Glycidyl methacrylate | 30 | 105 | 130 | 208 |

What is claimed is:

1. A two-component adhesive comprising of (1) a main composition comprising about 40 to about 80 parts by weight of at least one of divinyl compounds of the formula:

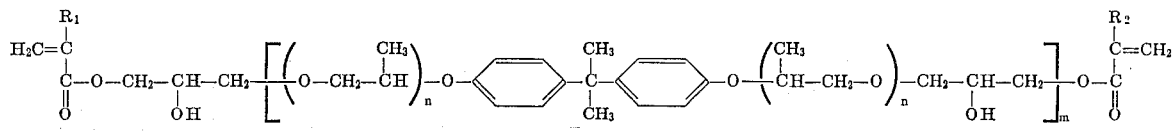

wherein $R_1$ and $R_2$ are each hydrogen, methyl or ethyl, $n$ is an integer of 1 to 5 and $m$ is an integer of 1 to 10, about 0.05 to about 10 parts by weight of an organic peroxide, about 2 to about 120 parts by weight of at least one mono-vinylic monomer selected from the group consisting of vinyl acetate, methacrylic acid, acrylic acid, glycidyl methacrylate and β-hydroxyethyl methacrylate (the amount of each mono-vinylic monomer not exceeding 40 parts by weight) and about 0.5 to about 15 parts by weight of at least one rubber material selected from the group consisting of acrylonitrile-butadiene-styrene polymer, acrylonitrile-butadiene rubber and carboxylated NBR and (2) an accelerator composition comprising about 0.01 to about 10 parts by weight of a thiourea compound, about 0.01 to about 10 parts by weight of α, α'-dipyridyl, about 0.001 to about 5 parts by weight of at least one of copper salts, cobalt salts, manganese salts, chromium salts and vanadium salts of organic and inorganic acids and about 75 to about 100 parts by weight of an organic volatile solvent.

2. The two-component adhesive according to claim 1, wherein the main composition comprises about 45 to about 60 parts by weight of at least one of the vinyl compounds, about 0.5 to about 5 parts by weight of an organic peroxide, about 10 to about 120 parts by weight of at least one mono-vinylic monomer and about 1.0 to about 10 parts by weight of at least one rubber material and the accelerator composition comprises about 0.1 to about 7 parts by weight of a thiourea derivative, about 0.05 to about 5 parts by weight of α, α'-dipyridyl, about 0.001 to about 3 parts by weight of at least one of copper salts, cobalt salts, manganese salts, chromium salts and vanadium salts of organic and inorganic acids and about 75 to about 100 parts by weight of an organic volatile solvent.

3. The two-component adhesive according to claim 2, wherein the main composition contains additionally at least one of a heat-resistant additive and a plasticizer.

4. The two-component adhesive according to claim 1, wherein the organic peroxide is cumene hydroperoxide, 2-methylbutene hydroperoxide, ethyl ether hydroperoxide, 2,5-dimethylhexane hydroperoxide, p-menthane hydroperoxide or t-butyl hydroperoxide.

5. The two-component adhesive according to claim 1, wherein the thiourea compound is trimethylthiourea, dipropionylthiourea, diacetylthiourea or tetramethylthiourea.

6. The two-component adhesive according to claim 1, wherein the organic volatile solvent is a lower alcohol, a ketone, an ester or a halogenated hydrocarbon.

7. The two-component adhesive according to claim 5, wherein the organic volatile solvent is a lower alcohol, a ketone, an ester or a halogenated hydrocarbon.

8. The two-component adhesive according to claim 1, wherein said thiourea compound is trimethylthiourea, dipropionylthiourea, diacetylthiourea or tetramethylthiourea; wherein said organic and inorganic acids are hydrochlorides, sulfates, nitrates, phosphates, aliphatic carboxylates and aromatic carboxylates; and wherein said organic volatile solvent is methanol, acetone, methylethylketone, methylene chloride, ethylene trifluoride or ethylene chlorofluoride.

9. The two-component adhesive according to claim 6, wherein said organic volatile solvent is methanol, acetone, methylethyl ketone, methylene chloride, ethylene trifluoride or ethylene chlorofluoride.

10. The two-component adhesive according to claim 1, wherein said organic peroxide is cumene hydroperoxide, 2-methylbutene hydroperoxide, ethyl ether hydroperoxide, 2,5-dimethylhexane hydroperoxide, p-methane hydroperoxide, t-butyl hydroperoxide or mixtures thereof.

11. The two-component adhesive according to claim 1, wherein component (1) and component (2) are mixed.

12. The two-component adhesive according to claim 1 comprising the reaction product of component (1) and component (2).

13. The two-component adhesive according to claim 1, wherein said organic peroxide is cumene hydroperoxide, 2-methylbutene hydroperoxide, ethyl ether hydroperoxide, 2,5-dimethylhexane hydroperoxide, p-methane hydroperoxide, t-butyl hydroperoxide or mixtures thereof; wherein said thiourea compound is trimethylthiourea, dipropionylthiourea, diacetylthiourea or tetramethylthiourea; wherein said organic and inorganic acids are hydrochlorides, sulfates, nitrates, phosphates, aliphatic carboxylates or aromatic carboxylates; and further wherein said organic solvent is methanol, acetone, methylethylketone, methylene chloride, ethylene trifluoride or ethylene chlorofluoride.

14. The two-component adhesive according to claim 3, wherein said heat-resistant additive is vinyl laurate, N-vinylurethane, divinyl-benzene, N-vinylglycidylurethane, diallyl laurate, diallyl phthalate, diallylmelamine, triallyl cyanurate or triacrylformal; and further wherein said plasticizer is di-n-butyl phthalate, di-2-ethylhexyl phthalate, butyl benzyl phthalate, di-2-ethylhexyl adipate, dimethyl sebacate, diethyl sebacate, dibutyl sebacate, tri-2-ethylhexyl phosphate or tricresyl phosphate.

15. The two-component adhesive according to claim 3, wherein the main composition contains a heat-resistant additive selected from the group consisting of vinyl laurate, N-vinylurethane, divinylbenzene, N-vinylglycidylurethane, diallyl laurate, diallyl phthalate, diallylmelamine, triallyl cyanurate and triacrylformal.

16. The two-component adhesive according to claim 3, wherein the main composition contains a plasticizer selected from the group consisting of di-n-butyl phthalate, di-2-ethylhexyl phthalate, butyl benzyl phthalate, di-2-ethylhexyl adipate, dimethyl sebacate, diethyl sebacate, dibutyl sebacate, tri-2-ethylhexyl phosphate and tricresyl phosphate.

17. The two-component adhesive according to claim 1, wherein said divinyl compound is a reaction product of (1) about 207 parts of a glycol diglycidyl ether having an epxoy equivalent of about 330 to 360, (2) about 48 parts methacrylic acid, and (3) about 12 parts acrylic acid.

18. The two-component adhesive according to claim 17, wherein said rubber is NBR and wherein said organic peroxide is cumene hydroperoxide.

19. The two-component adhesive according to claim 18, wherein said accelerator composition consists essentially of about 0.8 parts tetramethyl thiourea, 0.01 part cobalt acetate, 0.05 part cobalt napthanate, 1.0 part $\alpha, \alpha'$-dipyridyl, 80 parts acetone and 20 parts methanol.

20. The two-component adhesive according to claim 14, wherein said divinyl compound is the reaction product of about 207 parts of a glycol diglycidyl ether having an epoxy equivalent of 330 to 360, and about 52 parts of acrylic acid.

21. The two-component adhesive according to claim 20, wherein said rubber is NBR and further wherein said organic peroxide is cumene hydroperoxide.

22. The two-component adhesive according to claim 21, wherein said accelerator composition consists essentially of about 0.8 part tetramethyl thiourea, 0.01 part cobalt acetate, 0.05 part cobalt naphthanate, 1.0 part $\alpha, \alpha'$-dipyridyl, 80 parts acetone and 20 parts methanol.

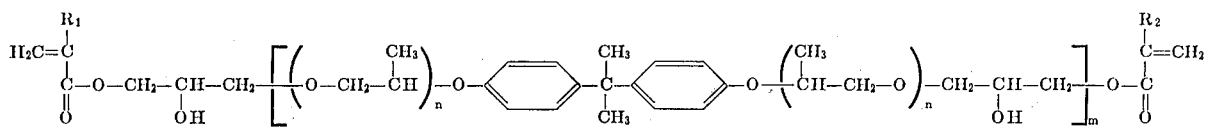

23. An adhesive consisting essentially of about 40 to 80 parts by weight of at least one divinyl compound of the formula:
wherein $R_1$ and $R_2$ are each hydrogen, methyl or ethyl, $n$ is an integer of 1 to 5 and $m$ is an integer of 1 to 10, about 0.05 to about 10 parts by weight of an organic peroxide, about 2 to about 120 parts by weight of at least one mono-vinylic monomer selected from the group consisting of vinyl acetate, methacrylic acid, acrylic acid, glycidyl methacrylate and $\beta$-hydroxyethyl methacrylate (the amount of each mono-vinylic monomer not exceeding 40 parts by weight) and about 0.5 to about 15 parts by weight of at least one rubber material selected from the group consisting of acrylonitrile-butadiene-styrene polymer, acrylonitrile-butadiene rubber and carboxylated NBR.

24. The adhesive according to claim 23, wherein said organic peroxide is cumene hydroperoxide, 2-methylbutene hydroperoxide, ethyl ether hydroperoxide, 2,5-dimethylhexane hydroperoxide, p-methane hydroperoxide, t-butyl hydroperoxide or mixtures thereof.

25. The two-component adhesive according to claim 1, wherein $m$ is 1.

26. The adhesive according to claim 23, wherein $m$ is 1.

* * * * *